3,471,477
6-GEM-DIFLUORO [3,2-C] AND [2,3-D] PYRAZOLE STEROIDS
John H. Fried, Palo Alto, Calif., assignor to Syntex Corporation, Panama, Panama, a corporation of Panama
No Drawing. Filed Oct. 18, 1967, Ser. No. 676,020
Int. Cl. C07c 173/10; A61k 27/00
U.S. Cl. 260—239.5        21 Claims

ABSTRACT OF THE DISCLOSURE

6α,6β-difluoropregn-4-eno-[3,2-C] and [2,3-D] pyrazole derivatives (substituted at C–11β with hydroxy or chloro; and at C–21 with hydroxy and the ethers and esters thereof; optionally substituted at the C–9α position with fluoro or chloro; at the C–16 position with methyl, hydroxy and the esters thereof; at the C–17α position with hydroxy and the esters thereof, and in conjunction with the C–16α position acetal or ketal; and at the 1' or 2' position with alkyl or aryl) are anti-inflammatories.

---

The present invention relates to novel 6-gem-difluoro pyrazole steroids and to processes for their preparation.

More particularly, this invention relates to 6α,6β-difluoropregn-4-eno-[3,2-C] and [2,3-D] pyrazoles substituted at the 11-position with either hydroxy or chloro. The novel 6-gem-difluoro pyrazole steroids of the present invention can be represented by the following formula:

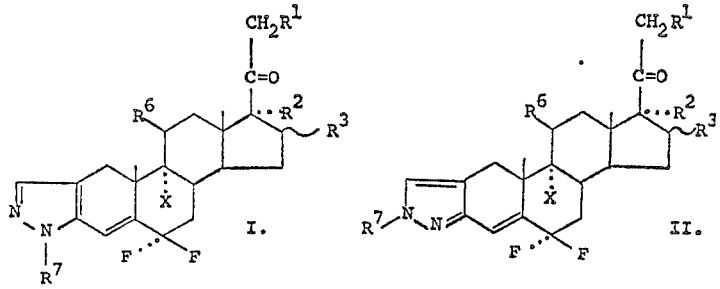

wherein $R^1$ is hydroxy, a conventional hydrolyzable ether, or a conventional hydrolyzable ester; $R^2$ is hydrogen, hydroxy, or a conventional hydrolyzable ester; $R^3$ is hydrogen, hydroxy, methoxy, or a conventional hydrolyzable ester; $R^2$ and $R^3$ when taken together are the group

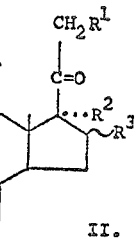

where each of $R^4$ and $R^5$ is hydrogen, lower alkyl of from 1 to 6 carbon atoms, cycloalkyl of 5 or 6 carbon atoms, or phenyl; $R^6$ is hydroxy or chloro; X is hydrogen, fluoro or chloro, provided that each of $R^6$ and X is chloro only when both are simultaneously chloro; $R^7$ is hydrogen, methyl, phenyl, p-fluorophenyl or p-chlorophenyl; and the wavy line at the C–16 position represents the alpha or beta configuration.

Included within the present invention and especially preferred are the 6-gem-difluoro [3,2-C] pyrazole steroids substituted at the C–11β position with hydroxy or chloro, at the C–21 position with hydroxy or the esters thereof, at the 2'-position with hydrogen, phenyl or p-fluorophenyl, and optionally substituted at the C–9α position with fluoro or chloro, provided that each of the C–9α and C–11β positions is substituted with chloro only when both positions are simultaneously substituted with chloro, at the C–16α or C–16β positions with methyl, and at the C–17α position with hydroxy or an ester thereof and in conjunction with the C–16α position with an acetal or ketal group bridging the 16α,17α-positions.

The novel 6-gem-difluoro unsubstituted or 1' or 2'-substituted [3,2-C] and [2,3-D] pyrazole steroids of the present invention are valuable medicinal steroids possessing antiinflammatory and glucocorticoid activity. Accordingly, the present compounds are useful in the treatment of allergic diseases, collagen diseases, musculoskeletal diseases, skin diseases, and the like. These novel steroids are administered via conventional pharmaceutical routes such as orally, parenterally, topically, and the like.

The dosage unit for oral or parental administration varies, depending upon the condition being treated, the physical and mental condition of the patient, man or animal, and the like. Normally, however, dosage units in the range of about 0.001 mg. to about 1.0 mg. per kilogram of body weight per day are administered.

Whatever route of administration is employed, the present compounds are administered in the usual pharmaceutically acceptable forms. For example, the present compounds are administered orally as solids in the form of pills, tablets, powders (free or encapsulated), and the like; or as liquids in the form of solutions, suspensions, syrups, and the like. The present compounds are usually administered parenterally as liquids in suspensions or solutions. Topically, the present compounds are administered as powders, creams, ointments, solutions, suspensions, aerosoles, foams, and the like, containing about 0.001% to about 1% of the steroid, with the remainder being a pharmaceutically-accepted inert vehicle or combinations of inert vehicles.

Orally, parenterally and topically, the present novel 6-gem-difluoro unsubstituted or 1' or 2'-substituted [3,2-C] and [2,3-D] pyrazole steroids are administered alone or in combination with one or more pharmaceutically-accepted therapeutic agents, such as anti-biotics.

The term "lower alkyl" denotes a group comprising a straight or branch chain aliphtic hydrocarbon of from 1 to 6 carbon atoms. Typical of such lower alkyl groups are methyl, ethyl, isopropyl, propyl, butyl, pentyl, hexyl and the like.

The term "cyclic alkyl" denotes a group comprising a cyclic hydrocarbon of 5 to 6 carbon atoms, i.e. cyclopentyl and cyclohexyl.

The acetal groups bridging the 16α,17α-positions of the present compounds are methylenedioxy groups optionally substituted with a lower alkyl group, a cycloalkyl group, or a phenyl group. Typical acetal groups include methylenedioxy, ethylidenedioxy, 2-cyclohexyl ethylenedioxy, phenylmethylenedioxy, and the like.

The ketal groups bridging the 16α,17α-positions of the present compounds are methylenedioxy groups substituted with any two of the following groups: alkyl, cycloalkyl or phenyl. Typical ketal groups include acetonide (isopropylidenedioxy) 2-butylidenedioxy, dicyclohexylmethyldioxy, diphenylmethylenedioxy, and the like.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogen, and the like, attached to the hydrocarbon backbone chain. Typical conventional hydrolyzable esters thus included within the scope of the term and the instant invention are formate, acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

The term "conventional hydrolyzable ether" as used herein denotes those hydrolyzable ether groups conventionally employed in the art, preferably those derived from normal, branched chain and cyclic hydrocarbons and aromatic hydrocarbons. The term "hydrocarbon" defines both substituted and unsubstituted hydrocarbons. Typical substituted groups include hydroxy, alkoxy containing up to 6 carbon atoms, acyloxy containing up to 12 carbon atoms, nitro, amino, halo, azo and the like. These hydrocarbons (except for the aromatic hydrocarbons) can be completely saturated or possess (including aromatic hydrocarbons) varying degrees of unsaturation. Preferably the contain from 1 to 12 carbon atoms. Typical conventional hydrolyzable ethers thus include methoxy, ethoxy, propoxy, 2-propoxy, cyclopropoxy, butoxy, 2-butoxy, 2-butoxy, t-butoxy, cyclobutoxy, pentoxy, 3-pentoxy, cyclopentoxy, hexoxy, cyclohexoxy, methylmethylenedioxy, 2-methoxyethoxy, 2-ethoxyethoxy, 2-aminoethoxy, 2-chloroethoxy, 3-fluorobutoxy, 2-acetoxyethoxy, 3-nitropropoxy, 3-aminocyclobutoxy, 4 - hexylcyclohexoxy, 2 - phenoxyethoxy, phenoxy, tolyloxy, chlorophenoxy, 3,5-dimethylphenoxy, p-nitrophenoxy, β-chloropropoxy, p-amino-phenoxy, tetrahydrofuran-2'-yloxy, tetrahydropyran-2'-yloxy, and the like.

The present novel 6-gem-difluoro [3,2-C] and [2,3-D] pyrazole steroids can be made by any of several chemical routes. One such route can be illustrated by the following reaction sequence:

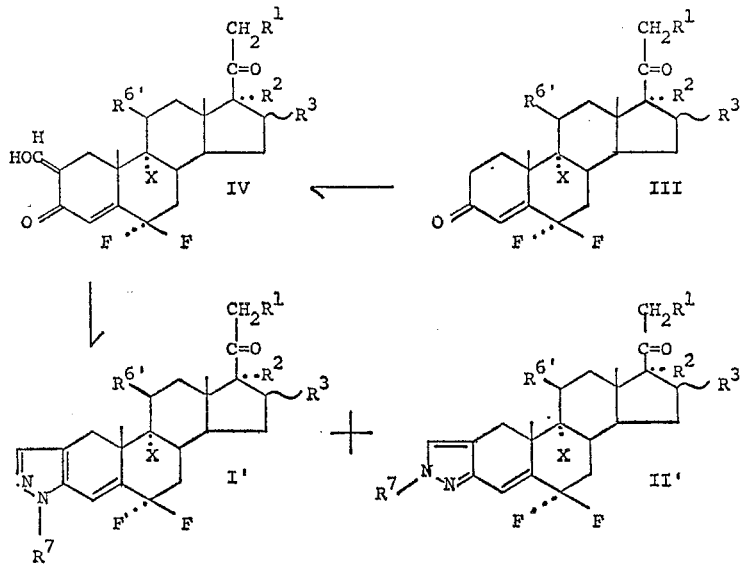

wherein $R^1$, $R^2$, $R^3$, $R^7$ and X are as defined hereinbefore; and $R^{6'}$ is hydrogen, hydroxy or chloro.

Compounds I' and II' are prepared simultaneously. The wavy line at the C-16 position represents the alpha or beta configuration.

The present novel 6-gem-difluoro [3,2-C] and [2,3-D] pyrazole steroids, the compounds of Formulas I' and II', can be prepared from 6-gem-difluoro starting steroids, the compounds of Formula III, in two or three steps. Initially, the 2-hydroxymethylene group is introduced onto the novel 6-gem-difluoro steroids, the compounds of Formula III, to obtain 2-hydroxymethylene-6-gem-difluoro steroids, the novel compounds of Formula IV. Second, the pyrazole moiety is introduced onto the compounds of Formula IV to furnish 6-gem-difluoro [3,2-C] and [2,3-D] pyrazole steroids, the novel compounds of Formulas I' and II'. The compounds of Formulas I' and II' are the compounds of Formulas I and II respectively when $R^{6'}$ is hydroxy or chloro. However, when $R^{6'}$ is hydrogen, a third step is required; the introduction of an 11β-hydroxy group onto the compounds of Formula I' to furnish the 11β-hydroxy compounds of Formulas I and II.

The novel compounds of Formula IV are prepared by treating the compounds of Formula III with a trialkyl orthoformate and an alkali metal hydride, such as sodium hydride in a non-aqueous, preferably anhydrous, inert organic solvent, such as an aliphtic or aromatic hydrocarbon. At the completion of the reaction, the reaction product is hydrolyzed with an aqueous acid, such as aqueous hydrochloric acid, to afford the compounds of Formula IV.

The pyrazole moiety is introduced onto the compounds of Formula IV to obtain the novel 6-gem-difluoro [3,2-C] and [2,3-D] pyrazole steroids of Formulas I' and II' by causing the compounds of Formula IV to react with an unsubstituted or monosubstituted hydrazine hydrochloride salt. The reaction is performed in a non-aqueous, preferably anhydrous, inert organic solvent, such as an alkanol, e.g. methanol, ethanol, and the like. The reaction is performed under anhydrous conditions and preferably the reaction is performed in an inert atmosphere, such as in a nitrogen gas atmosphere.

The product is isolated by conventional techniques; for example, the reaction mixture is evaporated, the residue is extracted with methylene chloride, washed with aqueous acid, then with water to neutrality, dried and evaporated.

When a substituted hydrazine, such as phenyl hydrazine, is utilized in the above reaction, a mixture of two identifiable products is obtained; the 2'-substituted [3,2–C] pyrazole derivative, the compound of Formula I', and the 1'-substituted [2,3–D] pyrazole derivative, the compound of Formula II'. The two isomeric derivatives are separated by conventional techniques, such as chromatography, crystallization, and the like.

When an unsubstituted hydrazine is utilized only one product is obtained that exists in two tautomeric forms, the [3,2–C] form and [2,3–D] form, which are in equilibrium.

Various hydrazine acid salts can be used in the above reaction; for example, the hydrochloride salts of hydrazine, ethyl hydrazine, phenyl hydrazine, p-tolyl hydrazine, p-fluorophenyl hydrazine, p-chlorophenyl hydrazine, and the like.

In the situation where the compounds of Formulas I' or II' are unsubstituted at the C–11β position, the 11β-hydroxy group is introduced by incubating such compounds with excised adrenal glands, or extracts thereof, or incubating with 11β-hydroxylating micro-organisms, such as *Curvularia lunata*, in an appropriate nutrient media.

In the preferred embodiment of the present invention, the starting materials of Formula III used to make the novel 9α,11β - dichloro-6-gem-difluoro [3,2–C] pyrazole steroids will have the 9α,11β-chloro groups.

In the preferred embodiment of this invention, the 21-hydroxy group present on the 6-gem-difluoro starting steroid is protected during the above reaction sequence. The 21-hydroxy group in conjunction with the 20-keto group and the 17α-hydroxy group, when present, is conveniently protected by the formation of the 17,20;20,21-bismethylenedioxy group by treating the 6,6-difluoro-17α, 21-dihydroxy-20-keto starting material with formaldehyde in the presence of hydrochloric acid. Alone, the 21-hydroxy group can be protected by the formation of an ester or ether group. Especially preferred is the 21-tetrahydropyran-2'-yloxy group which is prepared by treating the 6-gem-difluoro - 21 - hydroxy starting compounds of Formula II with sodium hydride and then with 2-chlorotetrahydropyran.

If the 21-hydroxy group is shielded by bulky groups in the near vicinity, such as a 16α,17α-isopropylidenedioxy group or 17α-acyloxy group, the 21-hydroxy group is normally left unprotected.

The 17,20;20,21-bismethylenedioxy group is readily hydrolyzed by treatment with aqueous 48% hydrogen fluoride or hydrogen chloride solution to afford the 17α,21-dihydroxy-20-keto configuration. A 21-ether group is hydrolyzed by treatment with p-toluene sulfonic acid in aqueous acetone to afford the 21-hydroxy group, and a 21-ester group is hydrolyzed by treatment with a 5% aqueous potassium carbonate solution to afford the 21-hydroxy group.

The novel 6-gem-difluoro starting steroids, the steroids of Formula III, are prepared from the corresponding 6-fluoro steroids according to a novel process described in co-pending U.S. application Ser. No. 676,060 filed Oct. 18, 1967.

Briefly, the process consists of preparing the 3-alkoxy-Δ³,⁵ derivatives of 3-keto-Δ⁴-6-fluoro steroids by treating the latter with a trialkyl orthoformate in the presence of an acid catalyst. The 3-alkoxy-Δ³,⁵-6-fluoro steroid is then allowed to react with perchloryl fluoride in an inert organic solvent to furnish the corresponding 6-gem-difluoro steroid of Formula III.

Typical novel starting 6-gem-difluoro starting steroids include

6α,6β-difluoro-11β,17α-dihydroxy-16α-methyl-21-acetoxypregn-4-ene-3,20-dione;
6α,6β-difluoro-11β,17α-dihydroxy-16α,21-diacetoxypregn-4-ene-3,20-dione;
6α,6β-difluoro-11β,21-dihydroxy-16α-methyl-17α-valeryloxypregn-4-ene-3,20-dione;
6α,6β,9α-trifluoro-11β,21-dihydroxy-16α-methyl-17α-valeryloxypregn-4-ene-3,20-dione;
6α,6β,9α-trifluoro-9α,11β-dichloro-16α,17α-isopropylidenedioxy-21-acetoxypregn-4-ene-3,20-dione;
6α, 6β, 9α-trifluoro-11β-hydroxy-21-valeryloxy-16α-methylpregn-4-ene-3,20-dione;
6α,6β-difluoro-11β,21-dihydroxy-16β-methylpregn-4-ene-3,20-dione;
6α,6β,9α-trifluoro-11β,21-dihydroxy-16α-methylpregn-4-ene-3,20-dione;
6α,6β-difluoro-11β,17α,21-trihydroxy-16β-methylpregn-4-ene-3,20-dione;
6α,6β,9α-trifluoro-11β,17α,21-trihydroxy-16α-methylpregn-4-ene-3,20-dione;
6α,6β-difluoro-11β,21-dihydroxy-16β-methyl-17α-valeryloxypregn-4-ene-3,20-dione;
6α,6β,9α-trifluoro-11β,21-dihydroxy-16β-methyl-17α-valeryloxypregn-4-ene-3,20-dione;
6α,6β-difluoro-9α,11β-dichloro-16β-methyl-21-hydroxypregn-4-ene-3,20-dione;
6α,6β-difluoro-9α,11β-dichloro-16α-methyl-17α,21-dihydroxypregn-4-ene-3,20-dione;
6α,6β-difluoro-9α,11β-dichloro-16α-methyl-17α-valeryloxy-21-hydroxypregn-4-ene-3,20-dione;
6α,6β-difluoro-11β,21-dihydroxy-16β-methyl-16α,17α-isopropylidenedioxypregn-4-ene-3,20-dione;
6α,6β,9α-trifluoro-11β,21-dihydroxy-16β-methyl-16α,17α-isopropylidenedioxypregn-4-ene-3,20-dione;
6α,6β-difluoro-9α,11β-dichloro-16β-methyl-16α,17α-isopropylidenedioxy-21-hydroxypregn-4-ene-3,20-dione;
6α,6β-difluoro-11β,21-dihydroxypregn-4-ene-3,20-dione;
6α,6β,9α-trifluoro-11β,21-dihydroxypregn-4-ene-3,20-dione;
6α,6β-difluoro-11β,17α,21-trihydroxypregn-4-ene-3,20-dione;
6α,6β-difluoro-9α,11β-dichloro-16α,17α-isopropylidenedioxy-21-hydroxypregn-4-ene-3,20-dione;
6α,6β,9α-trifluoro-11β,21-dihydroxy-17α-valeryloxypregn-4-ene-3,20-dione;

and the like, and the 11-unsubstituted derivatives and/or the 21 conventional hydrolyzable esters or ethers thereof.

The following examples are set forth to more fully illustrate the present invention; in no way should they be construed as expressing limitations of the present invention.

EXAMPLE 1

Part A

A suspension of 3 ml. of ethylformate and 1.3 g. of sodium hydride in mineral oil is added to a cooled solution of 3 g. of 6α,6β,9α-trifluoro-11β,21-dihydroxy-16α, 17α-isopropylidenedioxypregn-4-ene-3,20-dione in 60 ml. of anhydrous benzene. The reaction mixture is stirred for 24 hours under a nitrogen gas. Hexane is added to the mixture until complete precipitation occurs, then the solid is collected by filtration, washed and dried under vacuum. The solid is added to aqueous hydrochloric acid and stirred for one half hour, filtered, washed to neutrality with water to yield 2-hydroxymethylene-6α,6β,9α-trifluoro - 11β,21 - dihydroxy-16α,17α-isopropylidenedioxypregn-4-ene-3,20-dione, which is recrystallized from acetone:hexane.

Part B

Two and one-half grams of the above product are added to 60 ml. of ethanol together with 0.42 g. of sodium acetate. The mixture is saturated with nitrogen gas, and 0.82 g. of p-fluorophenyl hydrazine hydrochloride is added. The mixture is heated at reflux for one hour and then evaporated to dryness. The residue is dissolved in methylene chloride and washed with dilute acid, dilute base water to neutrality. The solution is dried, evaporated to dryness and placed in 50 ml. of dry acetone containing 0.2 ml. of concentrated hydrochloric acid. The mixture is allowed to stand for 10 hours at 25° C.; then it is added to 100 ml. of water. The solid that forms is filtered off, washed and dried. The residue is dissolved in benzene: chloroform (1:1) and chromatographed on alumina to yield one fraction containing 6α,6β,9α-trifluoro-11β,21-dihydroxy - 16α,17α - isopropylidenedioxy-20-oxo-1'-(4-fluorophenyl)pregn-4-eno-[2,3-D] pyrazole, and another fraction containing 6α,6β,9α-trifluoro-11β,21-dihydroxy-16α,17α - isopropylidenedioxy-20-oxo-2'-(4-fluorophenyl) pregn-4-eno-[3,2-C] pyrazole. The two fractions are identified by ultraviolet absorption spectroscopy.

Similarly,

6α,6β-difluoro-11β,21-dihydroxy-16α,17α-isopropylidenedioxy-20-oxo-2'-(4-fluorophenyl)pregn-4-eno-[3,2-C] pyrazole;

6α,6β,9α-trifluoro-11β,21-dihydroxy-16α,17α-(dicyclohexymethylenedioxy)-16β-methyl-20-oxo-2'-(4-fluorophenyl)pregn-4-eno-[3,2-C] pyrazole;

6α,6β-difluoro-11β-hydroxy-16α,17α-isopropylidenedioxy-21-acetoxy-20-oxo-2'-(4-fluorophenyl)pregn-4-eno-[3,2-C] pyrazole;

6α,6β,9α-trifluoro-11β-hydroxy-16α,17α-isopropylidenedioxy-21-acetoxy-20-oxo-2'-(4-fluorophenyl)pregn-4-eno-[3,2-C] pyrazole;

6α,6β,9α-trifluoro-11β-hydroxy-16α-methyl-20-oxo-21-acetoxy-2'-(4-fluorophenyl)pregn-4-eno-[3,2-C] pyrazole;

6α,6β-difluoro-9α,11β-dichloro-16α,17α-isopropylidenedioxy-20-oxo-21-hydroxy-2'-(4-fluorophenyl)pregn-4-eno-[3,2-C] pyrazole;

6α,6β-difluoro-9α,11β-dichloro-16α,17α-methylenedioxy-20-oxo-21-caproyloxy-2'-(4-fluorophenyl)pregn-4-eno-[3,2-C] pyrazole;

6α,6β-difluoro-11β-hydroxy-16α,17α-(3-phentylidenedioxy)-20-oxo-21-(tetrahydrofuran-2'-yloxy)-2'-(4-fluorophenyl)pregn-4-eno-[3,2-C$_5$ pyrazole;

6α,6β,9α-trifluoro-11β,21-dihydroxy-16α,17α-isopropylidene-20-oxo-2'-(4-fluorophenyl)pregn-4-eno-[3,2-C] pyrazole;

6α,6β-difluoro-9α,11β-dichloro-16β-methyl-16α,17α-isopropylidenedioxy-20-oxo-21-hydroxy-2'-(4-fluorophenyl)pregn-4-eno-[3,2-C] pyrazole;

6α,6β-difluoro-9α,11β-dichloro-16α-methyl-17α-valeryloxy-20-oxo-21-hydroxy-2'-(4-fluorophenyl)pregn-4-eno-[3,2-C] pyrazole;

6α,6β,9α-trifluoro-11β,21-dihydroxy-17α-valeryloxy-20-oxo-2'-(4-fluorophenyl)pregn-4-eno-[3,2-C] pyrazole;

6α,6β,9α-trifluoro-11β,21-dihydroxy-16α-methyl-17α-valeryloxy-20-oxo-2'-(4-fluorophenyl)pregn-4-eno-[3,2-C] pyrazole;

and the equivalent 1'-[2,3-D] pyrazole isomers are prepared from the corresponding 6-gem-difluoro starting steroids.

The corresponding novel 6-gem-difluoro-11-unsubstituted [3,2-C] pyrazoles are similarly prepared by the above process employing the corresponding 6-gem-difluoro-11-unsubstituted steroid. Accordingly, 6α,6β,9α-trifluoro - 16α,17α - isopropylidenedioxy-20-oxo-21-hydroxy-2'-(4-fluorophenyl)pregn-4-eno-[3,2-C] pyrazole is prepared from 6α,6β,9α-trofluoro-16α,17α-isopropylidenedioxy-21-hydroxypregn-4-ene-3,20-dione by the above process.

By employing the hydrochloride salts of hydrazine or phenyl hydrazine in place of p-fluorophenyl hydrazine hydrochloride in the above process, the corresponding 6α,6β-difluoro-[3,2-D] and -[3,2-C] pyrazole steroids and 6α,6β-difluoro-1'-phenyl-[2,3-D]- and -2'-phenyl-[3,2-C]-pyrazole steroids are obtained. Accordingly, 6α,6β,9α-trifluoro-11β,21-dihydroxy-16α,17α-isopropylidenedioxy-20-oxopregn-4-eno-[3,2-C] pyrazole;

6α,6β,9α-trifluoro-11β,21-dihydroxy-16α,17α-isopropylidenedioxy-20-oxo-2'-phenylpregn-4-ene-[3,2-C] pyrazole;

6α,6β-difluoro-11β,21-dihydroxy-16α,17α-isopropylidenedioxy-20-oxopregn-4-eno-[3,2-C] pyrazole;

6α,6β-difluoro-11β,21-dihydroxy-16α,17α-isopropylidenedioxy-20-oxo-2'-phenylpregn-4-eno-[3,2-C] pyrazole;

6α,6β,9α-trifluoro-11β-hydroxy-16α,17α-isopropylidenedioxy-21-acetoxy-20-oxopregn-4-ene-[3,2-C] pyrazole;

6α,6β,9α-trifluoro-11β-hydroxy-16α,17α-isopropylidenedioxy-21-acetoxy-20-oxo-2'-phenylpregn-4-eno-[3,2-C] pyrazole;

6α,6β,9α-trifluoro-11β-hydroxy-16α-methyl-20-oxo-21-acetoxypregn-4-eno-[3,2-C] pyrazole;

6α,6β,9α-trifluoro-11β-hydroxy-16α-methyl-20-oxo-21-acetoxy-2'-phenylpregn-4-eno-[3,2-C] pyrazole;

6α,6β-difluoro-9α,11β-dichloro-16α,17α-methylene-dioxy-20-oxo-21-caproyloxypregn-4-eno[3,2-C] pyrazole;

6α,6β-difluoro-9α,11β-dichloro-16α,17α-methylene-dioxy-20-oxo-21-caproyloxy-2'-phenylpregn-4-eno[3,2-C]pyrazole;

6α,6β,9α-trifluoro-11β,21-dihydroxy-17α-valeryloxy-20-oxopregn-4-eno-[3,2-C] pyrazole;

6α,6β,9α-trifluoro-11β,21-dihydroxy-17α-valeryloxy-20-oxo-2'-phenylpregn-4-eno-[3,2-C] pyrazole;

6α,6β,9α-trifluoro-11β,21-dihydroxy-16α-methyl-17α-valeryloxy-20-oxopregn-4-eno-[3,2-C] pyrazole; and 6α,6β,9α-trifluoro-11β,21-dihydroxy-16α-methyl-17α-valeryloxy-20-oxo-2'-phenylpregn-4-eno-[3,2-C] pyrazole;

and the equivalent 1'-[2,3-D] pyrazole isomers are prepared by employing hydrazine hydrochloride or phenylhydrazine hydrochloride in the above process together with the appropriate corresponding 6-gem-difluoro starting steroid.

EXAMPLE 2

Part A

To a stirred solution of 3 g. of 6α,6β,9α-trifluoro-11β-hydroxy - 16α - methyl - 17,20;20,21-bismethylene-dioxypregn-4-en-3-one in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-6α,6β,9α - trifluoro - 11β-hydroxy-16α-methyl-17,20; 20,21-bis-methylenedioxypregn-4-en-3-one, which is recrystallized from methylene chloride:hexane.

Part B

The product of Part A is added to 40 ml. of absolute ethanol together with 0.2 g. of sodium acetate. The mixture is saturated with argon gas, and then 0.4 g. of p-fluorophenyl hydrazine hydrochloride is added. The mixture is refluxed for one hour under an argon atmosphere and then evaporated to dryness under vacuum. The residue is taken up in methylene chloride, washed with aqueous 1 N sodium bicarbonate, water, dried over magnesium sulfate and evaporated to dryness. The residue is taken up in 25 ml. of anhydrous acetone containing 0.1 ml. of concentrated hydrochloric acid; the mixture is allowed to stand for 14 hours at room temperature. One hundred milliliters of water is added; the solid that crystallizes out is filtered off and dried to afford a mixture of 6α,6β,9α - trifluoro-11β-hydroxy-16α-methyl-17,20;20,21-bismethylenedioxy - 1' - (4-fluorophenyl)pregn - 4 - eno [3,2-C] pyrazole and 6α,6β,9α-trifluoro-11β-hydroxy-16α-methyl-17,20;20,21-bismethylenedioxy-2'-(4 - fluorophenyl)pregn - 4 - eno [3,2-C] pyrazole. The two isomers are separated by chromatography on an alumina eluting with benzene:chloroform (4:5). The two isomers are identified by ultraviolet spectroscopy.

Part C

A suspension of 1 g. of 6α,6β9α-trifluoro-11β-hydroxy-16α - methyl - 17,20;20,21 - bismethylenedioxy-2'-(4-fluorophenyl)pregn-4-eno [3,2-C] pyrazole in 10 ml. of 48% aqueous hydrofluoric acid is stirred at 0° C. for 90 minutes. The reaction mixture is then neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,6β, 9α-trifluoro-11β,17α,21-trihydroxy - 16α - methyl - 20-oxo-2' - (4-fluorophenyl)pregn-4-eno [3,2-C] pyrazole, which may be further purified through recrystallization from isopropanol.

Similarly, the following novel 6-gem-difluoro-[3,2-C] pyrazole steroids are prepared from the corresponding 6-gem-difluoro-17,20;20,21-bismethylenedioxy steroids:

6α,6β-difluoro-11β,17α21-trihydroxy-20-oxo-2'-(4-fluorophenyl)pregn-4-eno-[3,2-C] pyrazole;
6α,6β-difluoro-11β,17α,21-trihydroxy-16α-methyl-20-oxo-2'-(4-fluorophenyl)pregn-4-eno-[3,2-C] pyrazole;
6α,6β,9α-trifluoro-11β,17α,21-trihydroxy-20-oxo-2'-(4-fluorophenyl)pregn-4-eno-[3,2-C] pyrazole;
6α,6β-difluoro-9α,11β-dichloro-16α-methyl-17α,21-dihydroxy-20-oxo-2'-(4-fluorophenyl)pregn-4-eno-[3,2-C] pyrazole;
6α,6β-difluoro-9α,11β-dichloro-17α,21-dihydroxy-20-oxo-2'-(4-fluorophenyl)pregn-4-eno-[3,2-C] pyrazole;
and the 1'-[2,3-D] pyrazoles thereof.

By repeating the above process and by replacing p-fluorophenyl hydrazine hydrochloride with the hydrochloride salts of hydrazine, methyl hydrazine, phenyl hydrazine, or p-chlorophenyl hydrazine in Part B of the above process, 6α,6β,9α-trifluoro-11β,17α,21-trihydroxy-16α-methyl-20-oxopregn-4-eno-[3,2-C] pyrazole;
6α,6β,9α-trifluoro-11β-17α,21-trihydroxy-16α-methyl-20-oxo-2'-methylpregn-4-eno-[3,2-C] pyrazole;
6α,6β,9α-trifluoro-11β,17α,21-trihydroxy-16α-methyl-20-oxo-2'-phenylpregn-4-eno-[3,2-C] pyrazole;
6α,6β,9α-trifluoro-11β,17α,21-trihydroxy-16α-methyl-20-oxo-2'-(p-chlorophenyl)pregn-4-eno-[3,2-C] pyrazole and the corresponding 1'-[2,3-D] pyrazoles thereof respectively are prepared from 6α,6β,9α-trifluoro-11β-hydroxy - 16α-methyl-17,20;20,21 - bismethylenedioxypregn-4-en-3-one.

EXAMPLE 3

A mixture of 0.5 g. of 6α,6β-difluoro-11β-hydroxy-16α-methyl-20-oxo-21-(tetrahydropyran - 2' - yloxy) - 2'-phenyl-pregn-4-eno-[3,2-C] pyrazole [prepared from 6-fluoro-11β-hydroxy - 16α - methyl - 20 - oxo-21-(tetrahydropyran-2'-yloxy)-pregn-4-en-3-one by the process of Example 1] in 30 ml. of acetone and 50 mg. of p-toluenesulfonic acid is allowed to stand at room temperature for 15 hours. It is then poured into ice-water and extracted with ethyl acetate. These extracts are washed with water to neutrality, dried over sodium sulfate and evaporated to dryness. The residue is triturated with ether to yield 6α-6β-difluoro-11β,21-dihydroxy - 16α - methyl - 20 - oxo-2'-phenylpregn-4-eno-[3,2-C] pyrazole, which is recrystallized from acetone·hexane.

Similarly, the following 6-gem-difluoro-[3,2-C] pyrazole steroids are prepared from the corresponding 6-gem-difluoro-21-tetrahydropyran-2'-yloxy steroids by the processes of Examples 1 and 3:

6α,6β-difluoro-9α,11β-dichloro-21-hydroxy - 16α - methyl-20 - oxo - 2'-(4-fluorophenyl)pregn-4-eno-[3,2-C) pyrazole;
6α,6β-difluoro-11β,21-dihydroxy - 20 - oxo - 2' - (phenyl)pregn-4-eno-[3,2-C] pyrazole;
6α, 6β-difluoro-11β, 17α, 21-trihydroxy-16α-methyl-20-oxopregn-4-eno-[3,2-C] pyrazole;
and the corresponding 1'-[2,3-D] pyrazoles thereof.

EXAMPLE 4

A culture of *Cunninghamella bainieri* ATCC 9244 is prepared by inoculating an aqueous medium containing 2% peptone and 5% corn syrup with a vegetating growth of the above culture in the same medium and stirring with aeration for 24 hours at 28° C.

To 340 ml. of this culture are then added 10 ml. of 1% ethanolic solution of 6α, 6β-difluoro-17α, 21-dihydroxy-16α - methyl-20-oxo-2'-(4-fluorophenyl)pregn-4-eno-[3,2-C] pyrazole (prepared from 6-fluoro-16-methyl-17, 20; 20, 21-bismethylenedioxypregn-4-en-3-one by the process of Example 2). The mixture is stirred with aeration for 24 hours at 28° C. and then extracted several times with methylene chloride. These extracts are washed with water, dried over sodium sulfate, filtered and concentrated to a small volume under reduced pressure. The concentrated extracts are absorbed on a column of 20 g. of silica gel and 20 g. of Celite diatomaceous earth, previously washed with methylene chloride. Elution with 4:1 methylene chloride:acetone and crystallization yields 6α, 6β-difluoro-11β, 17α, 21-dihydroxy-16α-methyl-20-oxo-2'-(4-fluorophenyl)pregn-4-eno-[3,2-C] pyrazole.

Similarly, the following 6-gem-difluoro-11β-hydroxy steroids are prepared from the corresponding 6-gem-difluoro-11-unsubstituted steroids by the process of Example 1 or 2, and the above process:

6α,6β-difluoro-11β,21-dihydroxy - 16 - methyl - 17α - valeryloxy - 20 - oxo-2'-(fluorophenyl)pregn-4-eno-[3,2-C] pyrazole;
6α,6β-difluoro-11β,21-dihydroxy-20-oxo-17α - valeryloxy-2'-(4-fluorophenyl)pregn-4-eno-[3,2-C] pyrazole;
6α, 6β-difluoro-11β, 21-dihydroxy-20-oxo-17α-valeryloxy-1'-(4-fluorophenyl)pregn-4-eno-[3,2-C] pyrazole;
6α, 6β-difluoro-11β, 17α, 21-trihydroxy-20-oxo-2'-phenylpregn-4-eno-[3,2-C] pyrazole;
6α,6β-difluoro-11β,21-dihydroxy-16α,17α - isopropylidenedioxy-20-oxo-2'-(4-fluorophenyl)pregn-4-eno - [3,2-C] pyrazole;
6α-6β-difluoro-11β,21dihydroxy-17α-valeryloxy - 20 - oxo-2'-phenylpregn-4-eno-[3,2-C] pyrazole;
6α,6β-difluoro-11β,21-dihydroxy-16α,17α - isopropylidenedioxy - 16β - methyl-20-oxo-2'-(4-fluorophenyl)pregn-4-eno-[3,2-C] pyrazole; and
6α,6β,9α-trifluoro-11β,17α - dihydroxy - 16α - methyl - 20-oxo-21-acetoxy-2' - (4 - fluorophenyl)pregn - 4 - eno-[3, 2-C] pyrazole.

EXAMPLE 5

Part A

To a mixture of 1 g. of 6α,9α-trifluoro-11β,17α, 21 - trihydroxy - 16α - methyl-20-oxo-2'-(p-fluorophenyl) pregn-4-eno-[3,2-C] pyrazole and 10 ml. anhydrous peroxide free dioxane is added 4 g. of methyl ortho valerate and 0.5 g. of p-toluenesulfonic acid. The mixture is heated at 100° C. for a period of 2 hours; then it is cooled and 1 ml. of pyridine is added, followed by the addition of 100 ml. of water. The resulting solid is collected by filtration, washed with water, and dried to yield 6α,6β,9α - trifluoro - 11β-hydroxy-16α-methyl-17α,21-(1'''-methoxy)-pentylidenedioxy-20-oxo - 2' - (p-fluorophenyl) pregn-4-eno-[3,2-C] pyrazole, which is recrystallized from acetone-hexane.

Part B

A solution of 1.5 g. of 6α,6β,9α-trifluoro-11β-hydroxy-16α - methyl - 17α,21-(1'''-methoxy)pentylidenedioxy-20-oxo-2'-(p-fluorophenyl)pregn-4-eno-[3,2-C] pyrazole and 40 ml. of methanol and 30 ml. of 2 N oxalic acid are heated at 40° C. for 10 minutes. The reaction mixture is evaporated under reduced pressure, and the resulting residue is crystallized from methanol to yield 6α, 6β, 9α-trifluoro-11β,21-dihydroxy-16α-methyl - 17α - valeryloxy-20-oxo-2'-(p-fluorophenyl)pregn-4-eno-[3,2-C] pyrazole.

Similarly, other 17α,21-dihydroxy steroids of Examples 1–4 can be selectively esterified at the 17α position. Different ester groups are afforded by the utilization of the appropriate trimethyl alkylidynetrioxy.

What is claimed is:
1. The compounds of the formula

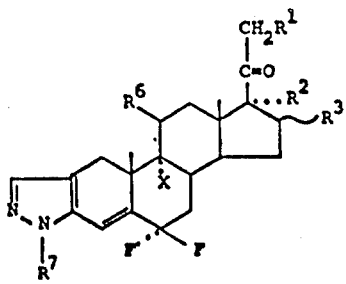

wherein
$R^1$ is hydroxy or a conventional hydrolyzable ester;
$R^2$ is hydrogen, hydroxy or a conventional hydrolyzable ester;
$R^3$ is hydrogen or methyl;
$R^2$ and $R^3$ taken together are the group:

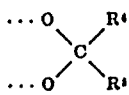

where each of $R^4$ and $R^5$ is lower alkyl or from 1 to 6 carbon atoms, cycloakyl of 5 or 6 carbon atoms, or phenyl;
$R^6$ is hydroxy or chloro;
$R^7$ is hydrogen, phenyl or p-fluorophenyl; and
X is hydrogen, fluoro or chloro, provided that $R^6$ and X are chloro only when both are simutaneously chloro.

2. The compounds according to claim 1 wherein $R^1$ is hydroxy or acetoxy;
$R^2$ is hydrogen, hydroxy or acetoxy;
$R^3$ is hydrogen or methyl;
$R^2$ and $R^3$ when taken together are the group:

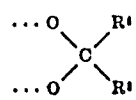

where each of $R^4$ and $R^5$ is methyl, ethyl, cyclopentyl, cyclohexyl or phenyl; and
$R^6$, $R^7$ and X are defined in claim 1.

3. The compounds according to claim 2 wherein
$R^1$ and $R^6$ are hydroxy;
$R^2$ and X are hydrogen;
$R^3$ is methyl; and
$R^7$ is p-fluorophenyl.

4. The compounds according to claim 2 wherein
$R^1$ and $R^6$ are hydroxy;
$R^2$ is hydrogen;
$R^3$ is methyl;
$R^7$ is p-fluorophenyl; and
X is fluoro.

5. The compounds according to claim 2 wherein
$R^1$, $R^2$ and $R^6$ are hydroxy;
$R^3$ is methyl;
$R^7$ is p-fluorophenyl; and
X is hydrogen.

6. The compounds according to claim 2 wherein
$R^1$, $R^2$ and $R^6$ are hydroxy;
$R^3$ is methyl;
$R^7$ is p-fluorophenyl; and
X is fluoro.

7. The compounds according to claim 2 wherein
$R^1$ and $R^6$ are hydroxy;
$R^2$ is valeryloxy;
$R^3$ is methyl;
$R^7$ is p-fluorophenyl; and
X is hydrogen.

8. The compounds according to claim 2 wherein
$R^1$ and $R^6$ are hydroxy;
$R^2$ is valeryloxy;
$R^3$ is methyl;
$R^7$ is p-fluorophenyl; and
X is fluoro;

9. The compounds according to claim 2 wherein
$R^1$ is hydroxy;
$R^2$ is hydrogen;
$R^3$ is methyl;
$R^6$ and X are chloro; and
$R^7$ is p-fluorophenyl.

10. The compounds according to claim 2 wherein
$R^1$ and $R^2$ are hydroxy;
$R^3$ is methyl;
$R^6$ and X are chloro; and
$R^7$ is p-fluorophenyl.

11. The compounds according to claim 2 wherein
$R^1$ is hydroxy;
$R^2$ is valeryloxy;
$R_3$ is methyl;
$R^6$ and X are chloro; and
$R^7$ is p-fluorophenyl.

12. The compound according to claim 2 wherein
$R^1$ and $R^6$ are hydroxy;
$R^2$ and $R^3$ are a 16α, 17α-acetonide group;
$R^7$ is p-fluorophenyl; and
X is hydrogen.

13. The compound according to claim 2 wherein
$R^1$ and $R^6$ are hydroxy;
$R^2$ and $R^3$ are a 16α, 17α-acetonide group;
$R^7$ is p-fluorophenyl; and
X is fluoro.

14. The compound according to claim 2 wherein
$R^1$ is hydroxy;
$R^2$ and $R^3$ are a 16α, 17α-acetonide group;
$R^6$ and X are choloro; and
$R^7$ is p-fluorophenyl.

15. The compounds according to claim 2 wherein
$R^1$, $R^2$ and $R^6$ are hydroxy;
$R^3$ is methyl; and
$R^7$ and X are hydrogen.

16. The compounds according to claim 2 wherein
$R^1$, $R^2$ and $R^6$ are hydroxy;
$R^3$ is methyl;
$R^7$ is hydrogen; and
X is fluoro.

17. The compound according to claim 2 wherein
$R^1$ and $R^6$ are hydroxy;
$R^2$ and $R^3$ are a 16α, 17α-acetonide group; and
$R^7$ and X are hydrogen.

18. The compound according to claim 2 wherein
$R^1$ and $R^6$ are hydroxy;
$R^2$ and $R^3$ are a 16α, 17α-acetonide group;
$R^7$ is hydrogen; and
X is fluoro.

19. The compounds according to claim 1 wherein
$R^1$ is acetoxy;
$R^2$ is hydrogen;
$R^3$ is methyl;
$R^6$ is hydroxy;
$R^7$ is p-fluorophenyl; and
X is fluoro.

20. The compounds according to claim 1 wherein
$R^1$ is acetoxy;

$R^2$ and $R^6$ are hydroxy;
$R^3$ is methyl;
$R^7$ is p-fluorophenyl; and
X is fluoro.

21. The compound according to claim 1 wherein
$R^1$ is acetoxy;
$R^2$ and $R^3$ are a 16α, 17α-acetonide group;
$R^6$ is hydroxy;
$R^7$ is p-fluorophenyl; and
X is fluoro.

References Cited

UNITED STATES PATENTS 3,219,673 11/1965 Boswell.
3,264,332 8/1966 Gould et al.

HENRY A. FRENCH, Primary Examiner

U.S. Cl. X.R.

195—51; 260—239.55, 397.45, 397.47, 999